United States Patent
Lin

(10) Patent No.: US 11,525,071 B2
(45) Date of Patent: Dec. 13, 2022

(54) POLISHING COMPOSITION BASED ON MIXTURE OF COLLOIDAL SILICA PARTICLES

(71) Applicant: FUJIMI INCORPORATED, Kiyosu (JP)

(72) Inventor: Jie Lin, Tualatin, OR (US)

(73) Assignee: FUJIMI INCORPORATED, Kiyosu (JP)

( * ) Notice: Subject to any disclaimer, the term of this patent is extended or adjusted under 35 U.S.C. 154(b) by 334 days.

(21) Appl. No.: 16/834,334

(22) Filed: Mar. 30, 2020

(65) Prior Publication Data

US 2021/0301173 A1  Sep. 30, 2021

(51) Int. Cl.
  *C09G 1/02* (2006.01)
  *H01L 21/321* (2006.01)
  *B24B 37/04* (2012.01)
  *C09K 3/14* (2006.01)

(52) U.S. Cl.
  CPC .............. *C09G 1/02* (2013.01); *B24B 37/044* (2013.01); *C09K 3/1409* (2013.01)

(58) Field of Classification Search
  None
  See application file for complete search history.

(56) References Cited

U.S. PATENT DOCUMENTS

| | | | |
|---|---|---|---|
| 9,640,407 B2* | 5/2017 | Yamato | C09K 3/1436 |
| 10,647,900 B2* | 5/2020 | Reichardt | H01L 21/30625 |
| 2006/0163206 A1* | 7/2006 | Belov | C09K 3/1454 |
| | | | 438/692 |
| 2008/0287038 A1* | 11/2008 | Miyabe | H01L 21/3212 |
| | | | 451/36 |
| 2017/0081553 A1* | 3/2017 | Tamada | C09K 3/1463 |
| 2019/0211227 A1* | 7/2019 | Dockery | C09K 3/1409 |

* cited by examiner

*Primary Examiner* — Shamim Ahmed
(74) *Attorney, Agent, or Firm* — Foley & Lardner LLP

(57) ABSTRACT

Provided herein are compositions comprising a first colloidal silica particle that is not surface-modified and a second colloidal silica particle that is surface modified to carry a negative charge. Also provided herein are methods for selectively removing $HfO_2$ or $SiO_2$ from a surface.

20 Claims, No Drawings

POLISHING COMPOSITION BASED ON MIXTURE OF COLLOIDAL SILICA PARTICLES

TECHNICAL FIELD

The present technology generally relates to compositions and methods for selectively removing $HfO_2$ or $SiO_2$ from surfaces comprising $HfO_2$ and/or $SiO_2$.

BACKGROUND

One of the major chemical mechanical polishing (CMP) challenges for semiconductor manufacturing is the selective polishing certain materials. Silicon dioxide ($SiO_2$) is widely used in semiconductors and other electronic materials. Hafnium oxide ($HfO_2$) is also used in semiconductors, e.g., it is widely used as a high-K material in FinFET (fin field-effect transistors) and as ferroelectric material in emerging new designs [J. Müller, et al., Ferroelectric Hafnium Oxide Based Materials and Devices: Assessment of Current Status and Future Prospects, *ECS J. Solid State Sci. Technol.* 2015 4(5): N30-N35; J. Müller, et al., Integration Challenges of Ferroelectric Hafnium Oxide Based Embedded Memory, *ECS Trans.* 2015 69(3): 85-95]. Slurries for polishing $HfO_2$ have been reported [Y. Feng, et al., Exploration of Novel Slurry on Hafnium Oxide Films Chemical Mechanical Planarization, *ECS Trans.* 2014 60(1): 647-652; K. Zhang, et al., Optimization and Mechanism on Chemical Mechanical Planarization of Hafnium Oxide for RRAM Devices, *ECS J. Solid State Sci. Technol.* 2014 3(7): P249-P252].

Electronic materials can contain $HfO_2$ and $SiO_2$. However, different materials such as $HfO_2$ and $SiO_2$ have different physical and chemical properties, and may demonstrate different selectivity when polishing.

Accordingly, a need exists for novel CMP compositions that can effectively and selectively polish $HfO_2$ and/or $SiO_2$ films.

SUMMARY OF THE DISCLOSURE

Provided herein are compositions comprising a mixture of colloidal silica particles and methods for polishing surfaces comprising $HfO_2$ and/or $SiO_2$ films.

Embodiments include a CMP composition comprising a first colloidal silica particle and a second colloidal silica particle, wherein the first colloidal silica particle is not surface-modified and the second colloidal silica particle is surface modified to carry a negative charge. In some embodiments, a pH of the composition is equal to or less than 1, 1.2, 1.4, 1.6, 1.8, 2, 2.2, 2.4, 2.6, 2.8, 3, 3.2, 3.4, 3.6, 3.8, 4, 4.2, 4.4, 4.6, 4.8, 5, 5.2, 5.4, 5.6, 5.8, 6, or 6.2 (e.g., equal to or less than 3.2). In some embodiments, the first colloidal silica particle and the second colloidal silica particle have a primary particle diameter that is substantially the same and a secondary particle diameter that is substantially the same. In some embodiments, a primary particle diameter of the first and second colloidal silica particles is about 10-90 nm and a secondary particle diameter of the first and second colloidal silica particles is about 20-220 nm. In some embodiments, a weight ratio of first colloidal silica particle to second colloidal silica particle is about 2:0.01 to 1:1. In some embodiments, a weight ratio of first colloidal silica particle to second colloidal silica particle is about 1:1 to 2:0.01. In some embodiments, the composition consists of the first colloidal silica particle, the second colloidal silica particle, water, a pH adjusting agent, and optionally one or more of a preservative, a biocide, a polymer, and a surfactant. In some embodiments, the first colloidal silica particle is present in an amount of greater than 0 wt. % to about 5 wt. %. In some embodiments, the second colloidal silica particle is present in an amount of greater than 0 wt. % to about 5 wt. %. In some embodiments, the first colloidal silica particle has a zeta potential at pH 3.2 of about −5 mV and the second colloidal silica particle has a zeta potential at pH 3.2 equal to or more negative than −30 mV.

Other embodiments include a method of selectively increasing a removal rate of $HfO_2$ from a surface comprising $HfO_2$ and $SiO_2$, comprising contacting the surface with a slurry comprising a first colloidal silica particle and a second colloidal silica particle, wherein the first colloidal silica particle is not surface-modified and the second colloidal silica particle is surface modified to carry a negative charge, and wherein a pH of the composition is equal to or less than 1, 1.2, 1.4, 1.6, 1.8, 2, 2.2, 2.4, 2.6, 2.8, 3, 3.2, 3.4, 3.6, 3.8, 4, 4.2, 4.4, 4.6, 4.8, 5, 5.2, 5.4, 5.6, 5.8, 6, or 6.2 (e.g., equal to or less than 3.2). In some embodiments, the removal rate of $HfO_2$ and $SiO_2$ is 10:1 or greater. In some embodiments, a weight ratio of first colloidal silica particle to second colloidal silica particle is greater than 3:1. In some embodiments, the removal rate of $HfO_2$ is 1000 Å/min or more. In some embodiments, the first colloidal silica particle is present in an amount of greater than 0 wt. % to about 5 wt. %. In some embodiments, the second colloidal silica particle is present in an amount of greater than 0 wt. % to about 5 wt. %. In some embodiments, the slurry consists of the first colloidal silica particle, the second colloidal silica particle, water, a pH adjusting agent, and optionally one or more of a preservative, a biocide, a polymer, and a surfactant.

Other embodiments include a method of selectively removing $HfO_2$ or $SiO_2$ from a surface comprising $HfO_2$ and $SiO_2$, comprising contacting the surface with a slurry comprising a first colloidal silica particle and a second colloidal silica particle, where the first colloidal silica particle is not surface-modified and the second colloidal silica particle is surface modified to carry a negative charge, and a pH of the composition is equal to or less than 1, 1.2, 1.4, 1.6, 1.8, 2, 2.2, 2.4, 2.6, 2.8, 3, 3.2, 3.4, 3.6, 3.8, 4, 4.2, 4.4, 4.6, 4.8, 5, 5.2, 5.4, 5.6, 5.8, 6, or 6.2 (e.g., equal to or less than 3.2), wherein the weight ratio of the first colloidal silica particle and the second colloidal silica particle has been adjusted to selectively remove $HfO_2$ and/or $SiO_2$. In some embodiments, a weight ratio of first colloidal silica particle to second colloidal silica particle is greater than 3:1. In some embodiments, a weight ratio of first colloidal silica particle to second colloidal silica particle is less than 3:1.

DETAILED DESCRIPTION

Provided herein are CMP compositions and methods for polishing surfaces comprising $HfO_2$ and/or $SiO_2$ films. As used herein, the term "chemical mechanical polishing" or "planarization" refers to a process of planarizing (polishing) a surface with the combination of surface chemical reaction and mechanical abrasion. In some embodiments, the chemical reaction is initiated by applying to the surface a composition (interchangeably referred to as a 'polishing slurry,' a 'polishing composition,' a 'slurry composition' or simply a 'slurry') capable of reacting with a surface material, thereby turning the surface material into a product that can be more easily removed by simultaneous mechanical abrasion. In some embodiments, the mechanical abrasion is performed by contacting a polishing pad with the surface, and moving the polishing pad relative to the surface.

Composition

The CMP polishing compositions disclosed herein can comprise, consist essentially of, or consist of one or more of the following components.

Abrasives

The CMP compositions of the present disclosure contain at least two different colloidal silica particle abrasives. In some embodiments, a first colloidal silica particle is not surface-modified and a second colloidal silica particle is surface modified to carry a negative charge.

General colloidal silica has a zeta potential value that is close to zero under an acidic condition. Silica particles that are surface modified to carry a negative charge may be, e.g., a structure that easily forms negative ions in the acidic or neutral region. Several methods are known to make silica particles that are surface modified to carry a negative charge. For example, colloidal silica on which an organic acid is fixed. Specifically, colloidal silica on which an organic acid is fixed is preferable. The organic acid is fixed on the colloidal silica by chemically binding the functional group of the organic acid on the surface of the colloidal silica. If the fixation of sulfonic acid, which is one of organic acids, on the colloidal silica is intended, the fixation can be conducted by, for example, the method described in "Sulfonic acid-functionalized silica through quantitative oxidation of thiol groups", Chem. Commun. 246-247 (2003). Specifically, a colloidal silica with sulfonic acid fixed on the surface thereof can be obtained by coupling a silane coupling agent having a thiol group such as 3-mercaptopropyltrimethoxysilane with colloidal silica, and oxidizing the thiol groups with hydrogen peroxide. Alternatively, if a carboxylic acid is to be fixed on colloidal silica, the fixation can be conducted by, for example, the method describe in "Novel Silane Coupling Agents Containing a Photolabile 2-Nitrobenzyl Ester for Introduction of a Carboxy Group on the Surface of Silica Gel", Chemistry Letters, 3, 228-229 (2000). Specifically, a colloidal silica with a carboxylic acid fixed on the surface thereof can be obtained by coupling a silane coupling agent containing a photoreactive 2-nitrobenzyl ester with colloidal silica, and irradiating the colloidal silica with light.

In some embodiments, the colloidal silica particle is surface modified to carry a negative charge under acidic conditions, e.g., at pH less than 7, 6, 5, 4, 3, or 2. In some embodiments, the negative charge under acidic conditions is, e.g., equal to or more negative than about −10, −20, −30, −40, −50 mV. In some embodiments, the negative charge under acidic conditions is a greater negative charge (i.e., more negative) than a corresponding unmodified colloidal silica particle under the same pH.

In some embodiments, the colloidal silica particle has a defined primary particle size and/or a defined secondary particle size. It will be understood that aggregates may be formed from a combination of individual particles, and these individual particles are known in the art as primary particles, whereas the agglomerated combination of particles are known in the art as secondary particles.

In some embodiments, the colloidal silica particle comprises an average primary particle diameter ($D_{P1}$) with a diameter of less than 100 nm, e.g., about 10-90 nm. In some embodiments, the colloidal silica particle comprises an average primary particle diameter ($D_{P1}$) with a diameter of about 10-120 nm, e.g., about 10, about 15, about 20, about 25, about 30, about 40, about 50, about 60, about 70, about 80, about 90, about 100, about 110 nm, or about 120 nm, or a range therein between. The abrasive's average primary particle diameter ($D_{P1}$) can be determined, for instance, from the specific surface area S (m$^2$/g) measured by the BET method, based on the equation for the average primary particle diameter $D_{P1}$ (nm)=2727/S. The abrasive's specific surface area can be measured by using, for instance, a surface area analyzer under trade name "FLOW SORB II 2300" available from Micromeritics.

The average secondary particle diameter ($D_{P2}$) of the colloidal silica is not particularly limited. From the standpoint of the polishing rate, etc., it is preferably 20, 30, 40, 50, 60, 65, 70, 75, 80, 90, 100, 150, 200 nm or larger. In some embodiments, the secondary particle diameter of the colloidal silica is a diameter of about 20, 30, 40, 50, 60, 65, 70, 75, 80, 85, 90, 95, 100, 105, 110, 115, 120, 125, 130, 135, 140, 145, 150, 160, 170, 180, 190, 200, 210, 220 nm, or a range therein between. In some embodiments, the colloidal silica particle comprises an average secondary particle diameter ($D_{P2}$) with a diameter of about 20 to 300 nm. In some embodiments, the colloidal silica particle has a secondary particle diameter that is about (e.g., within 10%, 15% or 20%) twice the diameter of the primary particle diameter.

The colloidal silica average secondary particle diameter $D_{P2}$ can be measured for an aqueous dispersion of the abrasive of interest (dispersion having a water-soluble polymer-free composition) as a measurement sample by dynamic light scattering using, for instance, model "UPA-UT151" available from Nikkiso Co., Ltd.

In some embodiments, the first colloidal silica particle and the second colloidal silica particle have a primary particle diameter that is substantially the same and/or a secondary particle diameter that is substantially the same. In some embodiments, the difference between the primary particle diameter and/or a secondary particle diameter of the first colloidal silica particle and the second colloidal silica particle is less than 20%, less than 10% or less than 5%. In some embodiments, the first colloidal silica particle and the second colloidal silica particle have a primary particle diameter that is different and/or a secondary particle diameter that different, and each diameter is independently selected from those listed herein.

In some embodiments, the present CMP composition comprises greater than 0 wt. % to about 5% by weight of the first colloidal silica particle abrasive and greater than 0 wt. % to about 5% by weight of the second colloidal silica particle abrasive. For example, the present CMP composition may comprise about 0.1, 0.2, 0.3, 0.4, 0.5, 0.6, 0.7, 0.8, 0.9, 1.0, 1.1, 1.2, 1.3, 1.4, 1.5, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, or 5.0% by weight of the first colloidal silica particle abrasive and about 0.1, 0.2, 0.3, 0.4, 0.5, 0.6, 0.7, 0.8, 0.9, 1.0, 1.1, 1.2, 1.3, 1.4, 1.5, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, or 5.0% by weight of the second colloidal silica particle abrasive.

In some embodiments, a weight ratio of first colloidal silica particle to second colloidal silica particle is about 2:0.01 to 1:1. In other embodiments, a weight ratio of first colloidal silica particle to second colloidal silica particle is about 1:1 to 2:0.01. The weight ratio of the first colloidal silica particle to second colloidal silica particle may be, e.g., 2:0.01; 10:1; 9:1; 8:1; 7:1; 6:1; 5:1; 4:1; 3:1; 2:1; 1:1, 1:2; 1:3; 1:4; 1:5; 1:6; 1:7; 1:8; 1:9; or 1:10.

Solvent

In some embodiments, the CMP compositions disclosed herein comprise one or more solvents. The solvent of the CMP slurry is not particularly limited. In some embodiments, the solvent is water, such as deionized water, a protic or nonprotic organic solvent such as an alcohol (e.g., methanol, ethanol, or isopropanol), or a mixture of two or more thereof.

pH Adjusting Agent

In some embodiments, the present CMP composition further comprises at least one pH adjusting agent. In some embodiments, the pH of the present CMP composition is less than 7, e.g., in the range of about 1 to about 6, inclusive of the end points. For example, in some embodiments, the pH of the present CMP composition is about 1, 1.2, 1.4, 1.6, 1.8, 2, 2.2, 2.4, 2.6, 2.8, 3, 3.2, 3.4, 3.6, 3.8, 4, 4.2, 4.4, 4.6, 4.8, 5, 5.2, 5.4, 5.6, 5.8, 6, or 6.2, or a range therein between.

In some embodiments, an acid is used as the pH adjusting agent. The acid used in connection with the present disclosure can be organic or inorganic compounds. Examples of the acid include inorganic acids such as sulfuric acid, nitric acid, boric acid, carbonic acid, hypophosphorous acid, phosphorous acid, and phosphoric acid; and organic acids such as carboxylic acids including formic acid, acetic acid, propionic acid, butyric acid, valeric acid, 2-methylbutyric acid, n-hexanoic acid, 3,3-dimethylbutyric acid, 2-ethylbutyric acid, 4-methylpentanoic acid, n-heptanoic acid, 2-methylhexanoic acid, n-octanoic acid, 2-ethylhexanoic acid, benzoic acid, glycolic acid, salicylic acid, glyceric acid, oxalic acid, malonic acid, succinic acid, glutaric acid, adipic acid, pimelic acid, maleic acid, phthalic acid, malic acid, tartaric acid, citric acid, and lactic acid, and organic sulfuric acids including methanesulfonic acid, ethanesulfonic acid, and isethionic acid.

Content of the acid in the CMP composition is not particularly limited as long as it is an amount allowing the CMP composition to be within the aforementioned pH range.

Other Components

The CMP composition of the present invention may contain, if necessary, other components, such as a preservative, a biocide, a polymer, a surfactant, or the like.

In some embodiments, for the purpose of enhancing the hydrophilicity of the surface to be polished or increasing the dispersion stability of abrasive, a water soluble polymer may be added to the present CMP composition. Examples of the water soluble polymer include a cellulose derivative such as hydroxymethyl cellulose, hydroxyethyl cellulose (HEC), hydroxypropyl cellulose, hydroxyethylmethyl cellulose, hydroxypropylmethyl cellulose, methyl cellulose, ethyl cellulose, ethylhydroxyethyl cellulose, or carboxymethyl cellulose; an imine derivative such as poly(N-acylalkyleneimine); polyvinyl alcohol; modified (cation modified or non-ion modified) polyvinyl alcohol; polyvinyl pyrrolidone; polyvinylcaprolactam; polyoxyalkylene such as polyoxyethylene; and a copolymer containing those constitutional units. The water soluble polymer may be used either alone or as a mixture of two or more kinds.

In some embodiments, the CMP composition according to the present disclosure may also comprise a biocide or other preservatives. Examples of preservatives and biocides that may be used in connection with the present invention include an isothiazoline-based preservative such as 2-methyl-4-isothiazolin-3-one or 5-chloro-2-methyl-4-isothiazolin-3-one, paraoxybenzoate esters, and phenoxyethanol, and the like. These preservatives and biocides may be used either alone or in mixture of two or more kinds thereof.

In some embodiments, the CMP composition does not contain an azol compound. In some embodiments, the CMP composition does not contain a compound having a triazole, a pyrazole, an imidazole, a thiazole, an oxazole, or an isoxazole.

In some embodiments, the CMP composition does not contain an oxidizer. In some embodiments, the composition does not contain a reducing agent.

Methods and Compositions

In another aspect of the present disclosure, provided herein are methods for CMP of an object having at least one surface. The method comprises, e.g., contacting the surface with a polishing pad; delivering a CMP composition according to the present disclosure to the surface; and polishing said surface with the CMP composition. In some embodiments, the surface includes $HfO_2$ or $SiO_2$.

Examples of the object to be polished may contain other components, such as silicon nitride, silicon oxide, amorphous silicon (a-Si) or polysilicon.

In this regard, examples of the polished object to be polished containing silicon oxide include a tetraethyl orthosilicate (TEOS)-type silicon oxide film formed by using tetraethyl orthosilicate as a precursor (hereinafter, also simply referred to as "TEOS"), a high discharge pressure (HDP) film, an undoped silicate glass (USG) film, a phosphorous silicate glass (PSG) film, a borophosphosilicate glass (BPSG) film, and a rapid thermal oxide (RTO) film.

In another aspect of the present disclosure, provided herein are methods of selectively increasing a removal rate of $HfO_2$ from a surface comprising $HfO_2$ and $SiO_2$, comprising contacting the surface with a slurry comprising a first colloidal silica particle and a second colloidal silica particle, wherein the first colloidal silica particle is not surface-modified and the second colloidal silica particle is surface modified to carry a negative charge, and wherein a pH of the composition is equal to or less than 1, 1.2, 1.4, 1.6, 1.8, 2, 2.2, 2.4, 2.6, 2.8, 3, 3.2, 3.4, 3.6, 3.8, 4, 4.2, 4.4, 4.6, 4.8, 5, 5.2, 5.4, 5.6, 5.8, 6, or 6.2 (e.g., equal to or less than 3.2).

In another aspect of the present disclosure, provided herein are methods for selectively removing $HfO_2$ or $SiO_2$ from a surface comprising $HfO_2$ and $SiO_2$, comprising contacting the surface with a slurry comprising a first colloidal silica particle and a second colloidal silica particle, where the first colloidal silica particle is not surface-modified and the second colloidal silica particle is surface modified to carry a negative charge, and a pH of the composition is equal to or less than 1, 1.2, 1.4, 1.6, 1.8, 2, 2.2, 2.4, 2.6, 2.8, 3, 3.2, 3.4, 3.6, 3.8, 4, 4.2, 4.4, 4.6, 4.8, 5, 5.2, 5.4, 5.6, 5.8, 6, or 6.2 (e.g., equal to or less than 3.2), wherein the weight ratio of the first colloidal silica particle and the second colloidal silica particle has been adjusted to selectively remove $HfO_2$ and/or $SiO_2$. In some embodiments, the slurry is a CMP composition according to the present disclosure.

In some embodiments, the removal rate of $HfO_2$ and $SiO_2$ is 10:1 or greater. For example, the removal rate ratio ($HfO_2$:$SiO_2$) can be 10:1, 15:1, 20:1, 25:1, 30:1, or greater. In other embodiments, the removal rate of $SiO_2$ and $HfO_2$ is 10:1 or greater. For example, the removal rate ratio ($SiO_2$:$HfO_2$) can be 10:1, 15:1, 20:1, 25:1, 30:1, or greater.

In another aspect of the present disclosure, provided herein are systems for chemical mechanical polishing (CMP). The system comprises a substrate comprising at least one surface having $HfO_2$ and/or $SiO_2$, a polishing pad, and a CMP composition according to the present disclosure.

In some embodiments, the removal rate of $HfO_2$ is 1000 Amin or more, e.g., 1000, 1200, 1300, 1400, 1500, 2000, 2500, 3000, 3500, 4000 or more.

In yet another aspect of the present disclosure, provided herein is a substrate comprising at least one surface having HfO$_2$ and/or SiO$_2$, wherein the substrate is in contact with a chemical mechanical polishing (CMP) composition according to the present disclosure.

In some embodiments, the present methods and compositions are suitable for polishing a surface having HfO$_2$ and/or SiO$_2$. An apparatus or conditions commonly used for CMP can be adopted and modified according to particular needs. The selections of a suitable apparatus and/or conditions for carrying out the present methods are within the knowledge of a skilled artisan.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely", "only" and the like in connection with the recitation of claim elements, or use of a "negative" limitation.

The term "about" will be understood by persons of ordinary skill in the art and will vary to some extent depending upon the context in which it is used. If there are uses of the term which are not clear to persons of ordinary skill in the art given the context in which it is used, "about" will mean up to plus or minus 10% of the particular term. Certain ranges are presented herein with numerical values being preceded by the term "about". The term "about" is used herein to provide literal support for the exact number that it precedes, as well as a number that is near to or approximately the number that the term precedes. In determining whether a number is near to or approximately a specifically recited number, the near or approximating unrecited number may be a number, which, in the context in which it is presented, provides the substantial equivalent of the specifically recited number.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

This disclosure is not limited to particular embodiments described, as such may, of course, vary. It is also to be understood that the terminology used herein is for the purpose of describing particular embodiments only, and is not intended to be limiting, since the scope of the present invention will be limited only by the appended claims.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order that is logically possible.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates that may need to be independently confirmed.

The following examples are given for the purpose of illustrating various embodiments of the disclosure and are not meant to limit the present disclosure in any fashion. One skilled in the art will appreciate readily that the present disclosure is well adapted to carry out the objects and obtain the ends and advantages mentioned, as well as those objects, ends and advantages inherent herein. The present examples, along with the methods described herein are presently representative of embodiments and are exemplary, and are not intended as limitations on the scope of the disclosure. Changes therein and other uses which are encompassed within the spirit of the disclosure as defined by the scope of the claims will occur to those skilled in the art.

EXAMPLES

Example 1: Effect of P2:P1 Ratio at pH 3.2

Slurries with 5 wt. % colloidal silica from P1 and P2 ("P2": Average primary particle diameter 32 nm, Average secondary particle diameter: 70 nm, on the surface of which sulfonic acid is immobilized). "P1" unmodified colloidal silica particle: Average primary particle diameter 32 nm, Average secondary particle diameter: 70 nm)), 0.0008 wt. % Kordex MLX, 0.26 wt. % acetic acid, and 74.4 wt. % DI water were prepared and a benchtop polisher was used to polish a film surface containing HfO$_2$ and SiO$_2$. The results are shown in Table 1.

TABLE 1

| | Effect of P2:P1 ratio at pH 3.2 | | | | | | | |
| | P2 | P1 | P2:P1 | Removal rate (Å/min) | | HfO$_2$/SiO$_2$ | Normalized rate | |
| Slurry | SiO$_2$ wt % | SiO$_2$ wt % | ratio | HfO$_2$ | SiO$_2$ | selectivity | HfO$_2$ | SiO$_2$ |
| Slurry A1 | 5.00% | 0.00% | 4:0 | 1310 | 91 | 14:1 | 1.31 | 0.40 |
| Slurry A2 | 3.75% | 1.25% | 3:1 | 1220 | 188 | 6.5:1 | 1.22 | 0.82 |
| Slurry A3 | 2.50% | 2.50% | 2:2 | 1210 | 249 | 4.9:1 | 1.21 | 1.09 |

TABLE 1-continued

Effect of P2:P1 ratio at pH 3.2

| Slurry | P2 SiO$_2$ wt % | P1 SiO$_2$ wt % | P2:P1 ratio | Removal rate (Å/min) HfO$_2$ | SiO$_2$ | HfO$_2$/SiO$_2$ selectivity | Normalized rate HfO$_2$ | SiO$_2$ |
|---|---|---|---|---|---|---|---|---|
| Slurry A4 | 1.25% | 3.75% | 1:3 | 1060 | 303 | 3.5:1 | 1.06 | 1.33 |
| Slurry A5 | 0.00% | 5.00% | 0:4 | 191 | 310 | 0.6:1 | 0.19 | 1.36 |

* Slurry based on acetic acid chemistry, pH = 3.2, total SiO2 % = 5%

At pH 3.2, HfO$_2$:SiO$_2$ selectivity is 14:1-0.6:1.

Comparative Example: Effect of P2:P1 Ratio at pH 8.7

Slurries with similar content to Slurry A1-A5, but at pH 8.7 were formulated, and a benchtop polisher was used to polish a film surface containing HfO$_2$ and SiO$_2$. The results are shown in Table 2.

TABLE 2

Effect of P2:P1 ratio at pH 8.7

| Slurry | P2 SiO$_2$ wt % | P1 SiO$_2$ wt % | P2:P1 ratio | Removal rate (Å/min) HfO$_2$ | SiO$_2$ | HfO$_2$/SiO$_2$ selectivity | Normalized rate HfO$_2$ | SiO$_2$ |
|---|---|---|---|---|---|---|---|---|
| Slurry D1 | 5.00% | 0.00% | 4:0 | 214 | 232 | 0.9:1 | 0.93 | 0.98 |
| Slurry D2 | 3.75% | 1.25% | 3:1 | 237 | 242 | 1:1 | 1.03 | 1.02 |
| Slurry D3 | 2.50% | 2.50% | 2:2 | 236 | 250 | 0.9:1 | 1.02 | 1.05 |
| Slurry D4 | 1.25% | 3.75% | 1:3 | 223 | 223 | 1:1 | 0.97 | 0.94 |
| Slurry D5 | 0.00% | 5.00% | 0:4 | 242 | 237 | 1:1 | 1.05 | 1.00 |

* Slurry based on acetate chemistry, pH = 8.7, total SiO2 % = 5%
* Benchtop polisher (Multiprep, Allied High Tech Products, Inc.), Fujibo H800 pad coupon = 1.5" × 1.5", pressure = 1.0 psi, platen/head speed = 200/23 rpm, slurry flow rate = 50 mL/min
* Normalized rate = (individual removal rate)/(mean removal rate of all five slurries)

At pH 8.7. HfO$_2$:SiO$_2$ selectivity is in a very small range of 0.9:1-1:1 regardless P2:P1 ratio. Thus, the formulation is nonselective at pH 8.7.

From the results in Tables 1 and 2, it can be seen that at pH 3.2, HfO$_2$:SiO$_2$ selectivity is improved significantly to 14:1-0.6:1 compared to the formulation at pH 8.7. This allows a tunable selectivity for polishing HfO$_2$/SiO$_2$ surfaces.

What is claimed is:

1. A CMP composition comprising a first colloidal silica particle and a second colloidal silica particle, wherein the first colloidal silica particle is not surface-modified and the second colloidal silica particle is surface modified to carry a negative charge.

2. The CMP composition of claim 1, wherein a pH of the composition is equal to or less than 3.2.

3. The CMP composition of claim 1, wherein the first colloidal silica particle and the second colloidal silica particle have a primary particle diameter and a secondary particle diameter that is, wherein the difference between the primary particle diameter or the secondary particle diameter of the first colloidal silica particle and the second colloidal silica particle is less than 20%.

4. The CMP composition of claim 1, wherein a primary particle diameter of the first and second colloidal silica particles is about 10-90 nm and a secondary particle diameter of the first and second colloidal silica particles is about 20-220 nm.

5. The CMP composition of claim 1, wherein a weight ratio of first colloidal silica particle to second colloidal silica particle is about 2:0.01 to 1:1.

6. The CMP composition of claim 1, wherein a weight ratio of first colloidal silica particle to second colloidal silica particle is about 1:1 to 2:0.01.

7. The CMP composition of claim 1, wherein the composition consists of the first colloidal silica particle, the second colloidal silica particle, water, a pH adjusting agent, and optionally one or more of a preservative, a biocide, a polymer, and a surfactant.

8. The CMP composition of claim 1, wherein the first colloidal silica particle is present in an amount of greater than 0 wt. % to about 5 wt. %.

9. The CMP composition of claim 1, wherein the second colloidal silica particle is present in an amount of greater than 0 wt. % to about 5 wt. %.

10. The CMP composition of claim 1, wherein the first colloidal silica particle has a zeta potential at pH 3.2 of about −5 mV and the second colloidal silica particle has a zeta potential at pH 3.2 equal to or more negative than −30 mV.

11. A method of selectively increasing a removal rate of HfO$_2$ from a surface comprising HfO$_2$ and SiO$_2$, comprising contacting the surface with a slurry comprising a first colloidal silica particle and a second colloidal silica particle,
wherein the first colloidal silica particle is not surface-modified and the second colloidal silica particle is surface modified to carry a negative charge, and wherein a pH of the composition is equal to or less than 3.2.

12. The method of claim 11, wherein the removal rate of HfO$_2$ and SiO$_2$ is 10:1 or greater.

13. The method of claim 11, wherein a weight ratio of first colloidal silica particle to second colloidal silica particle is greater than 3:1.

14. The method of claim 11, wherein the removal rate of HfO$_2$ is 1000 Å/min or more.

15. The method of claim 11, wherein the first colloidal silica particle is present in an amount of greater than 0 wt. % to about 5 wt. %.

16. The method of claim 11, wherein the second colloidal silica particle is present in an amount of greater than 0 wt. % to about 5 wt. %.

17. The method of claim 11, wherein the slurry consists of the first colloidal silica particle, the second colloidal silica particle, water, a pH adjusting agent, and optionally one or more of a preservative, a biocide, a polymer, and a surfactant.

18. A method of selectively removing $HfO_2$ or $SiO_2$ from a surface comprising $HfO_2$ and $SiO_2$, comprising contacting the surface with a slurry comprising a first colloidal silica particle and a second colloidal silica particle, where the first colloidal silica particle is not surface-modified and the second colloidal silica particle is surface modified to carry a negative charge, and a pH of the composition is equal to or less than 3.2, wherein the weight ratio of the first colloidal silica particle and the second colloidal silica particle has been adjusted to selectively remove $HfO_2$ and/or $SiO_2$.

19. The method of claim 18, wherein a weight ratio of first colloidal silica particle to second colloidal silica particle is greater than 3:1.

20. The method of claim 18, wherein a weight ratio of first colloidal silica particle to second colloidal silica particle is less than 3:1.

\* \* \* \* \*